W. D. HAINES.
SEED AND FERTILIZER DISTRIBUTER.
APPLICATION FILED DEC. 3, 1913.
1,223,967.
Patented Apr. 24, 1917.
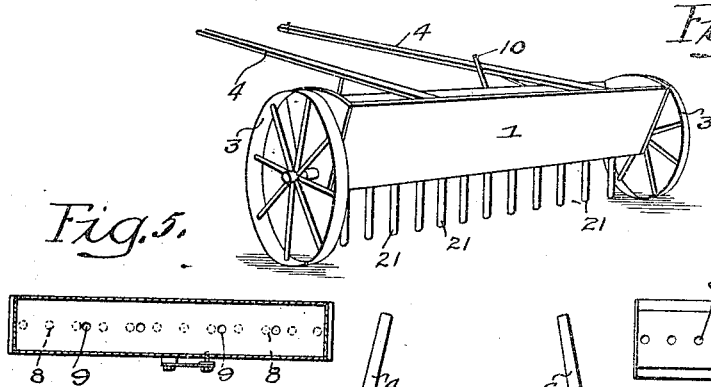
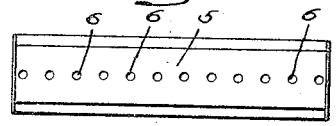
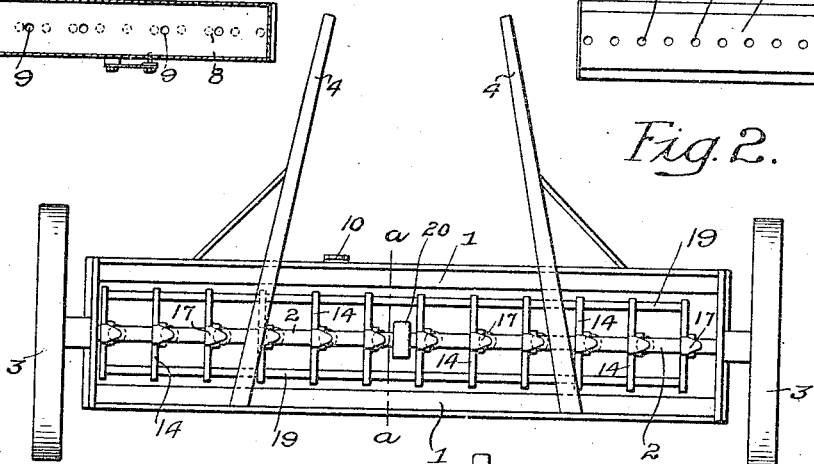
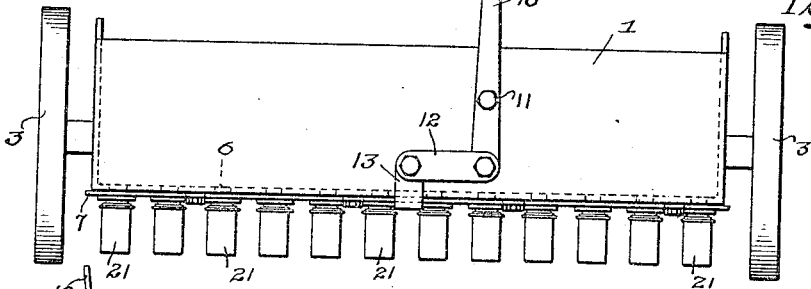
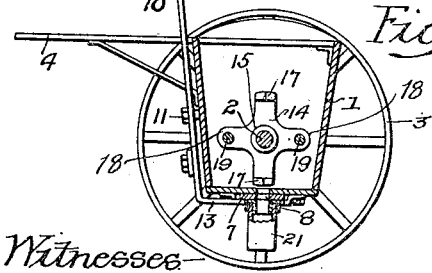
Witnesses
Walter Chism
William T. Nase
Inventor
William D. Haines
by his Attorneys
Howson & Howson

UNITED STATES PATENT OFFICE.

WILLIAM D. HAINES, OF HADDONFIELD, NEW JERSEY.

SEED AND FERTILIZER DISTRIBUTER.

1,223,967. Specification of Letters Patent. Patented Apr. 24, 1917.

Application filed December 3, 1913. Serial No. 804,522.

*To all whom it may concern:*

Be it known that I, WILLIAM D. HAINES, a citizen of the United States, residing in Haddonfield, Camden county, New Jersey, have invented certain Improvements in Seed and Fertilizer Distributers, of which the following is a specification.

One object of my invention is to provide a relatively simple and inexpensive yet substantial machine for delivering seed or fertilizer to ground which has previously been prepared for the reception of the same or to places where it is essential that the material shall be deposited without spreading or coming in contact with nearby plants.

Another object of the invention is to provide a device which shall automatically break up and discharge fertilizer or other material which is apt to cake, so that it will be delivered in measured quantities to the discharge tubes or spouts of the machine, it being also desired that the construction shall be such as to permit of the apparatus being conveniently and quickly adjusted for the distribution of seed or fertilizer as may be desired.

I further desire to provide a distributer having the above characteristics with novel means for agitating and breaking up lumps of powdered or finely divided fertilizer in order that the same may be delivered in predetermined quantities, the invention also contemplating a novel valve mechanism whereby the number of discharge openings may be varied to suit the machine for the delivery of seed or fertilizer.

These objects and other advantageous ends I attain as hereinafter set forth, reference being had to the accompanying drawings, in which:—

Figure 1 is a perspective view of a machine constructed according to my invention;

Figs. 2 and 3 are respectively a plan and a rear elevation of the machine shown in Fig. 1;

Fig. 4 is a transverse vertical section on the line *a—a* Fig. 2; and

Figs. 5 and 6 are a horizontal section and an inverted plan further illustrating my invention.

In the above drawings, 1 represents an elongated box-like body constituting the container for seed, fertilizer, etc., which is to be distributed, and this is preferably so built that it is wider at the top than at the bottom. Its ends are constructed to receive or provide bearings for a horizontal shaft 2, on whose opposite ends are fixed supporting wheels 3, there being a pair of shafts 4 connected to the body in any suitable manner and projecting forwardly in positions to permit of the machine being operated by horse power. In the bottom 5 of the body are a number of outlet openings 6, preferably arranged in a straight line and under each of them is a discharge pipe 21 so placed as to receive material passing out of the container body 1 and deliver it a short distance above the surface of the ground.

As shown in Fig. 4, I mount under the body an elongated metal plate or strip 7 constituting a valve for regulating the flow of material through the holes 6, and this has formed in it a line of holes, of which those indicated at 8 are spaced the same distance apart as said holes 6 in the bottom 5.

In addition to these holes 8, however, I provide a less number of holes 9 in the same straight line, so positioned that when the slide 7 is properly adjusted they may be brought into line with certain of the holes 6 to the exclusion of others. It is to be understood that the slide valve 7 is longitudinally movable under the body 1, and for the purpose of actuating it I provide a hand lever 10 pivoted at 11 to the front side of the body 1, and having its lower end connected through a link 12 to an arm 13, fixed to and projecting laterally from the slide valve 7.

Upon the shaft within the body 1, I fix a series of cast or other suitably formed structures 14, preferably having four arms extending from a hub 15 in lines substantially at right angles to each other. Of these arms the two indicated at 16, which extend in opposite directions, have their ends bent or formed at right angles to their bodies and shaped in the triangular form indicated at 17 to constitute cutting or crushing members. The second pair of arms 18 of all the structures 14 are respectively engaged by a pair of rods or bars 19 running for practically the full length of the interior of the body 1, and serve to agitate as well as assist in the breaking up of caked masses of the fertilizer.

The shaft 2 is preferably made in two sections connected by any suitable form of differential mechanism contained within the casing 20, and under operating conditions as the machine is drawn by suitable power over a field, for example, to distribute fertilizer, the latter is placed within the body 1 and is continuously agitated by the rods or bars 19, as well as by parts 17 of the cutters, as the structures 14 are rotated by the shaft. One of said structures is mounted over each of the outlet holes 6 in the bottom of the body 1, so that in case the fertilizer should be caked or lumpy, it is periodically broken or cut by the elements 17, as these successively pass over said openings.

I have found that fertilizer of the ordinary grades tends to collect as a solid body of substantially cylindrical form concentric with the shaft 2, and having a diameter equal to or slightly greater than the outermost portions of the pair of agitating bars 19. The cutters 17, however, cut or crush any lumps of material which would otherwise clog the outlet openings, and I have found even those fertilizers which are ordinarily most difficult to distribute, are delivered with substantial uniformity by my machine.

Obviously, when it is desired to deliver seed instead of fertilizer from the machine, the number of outlet openings required is materially less, and by means of the lever 10 I adjust the slide valve 7 so that the majority of the openings 6 are closed, the grain being discharged only from those which are in line with the openings 9 in said valve. If at any time it is desired to completely cut off the discharge of material from the machine, the lever 10 may be so adjusted as to bring the slide valve 7 to such a position that all of the openings 6 are closed.

The discharge spouts 21 are of such length that their lower ends extend into the immediate proximity of the ground surface, so that the seed or fertilizer is deposited where required without possibility of it being blown away or spread by the wind.

I claim:—

1. The combination in a distributer of a container having a series of outlets; a slide valve having two unequally spaced series of openings all in the same straight line; means for adjusting said slide valve to open different numbers of the outlets in the container including an operating lever mounted on the container; and means for connecting said lever to the slide valve.

2. The combination in a distributer of a container having a series of outlets; a slide having a number of series of openings all in the same straight line, the openings in one of said series being less in number than the outlets of the container; and means for moving said slide into any of several positions to bring the openings of any series into line with the outlets of the container.

3. The combination in a distributer of a container having a series of outlets; a slide valve having different numbers of openings; and means for adjusting said slide valve to open different numbers of the outlets in the container.

In testimony whereof, I have signed my name to this specification, in the presence of two subscribing witnesses.

WILLIAM D. HAINES.

Witnesses:
　WILLIAM E. BRADLEY,
　WM. A. BARR.

Copies of this patent may be obtained for five cents each, by addressing the "Commissioner of Patents, Washington, D. C."